United States Patent
Garcia et al.

[19]

[11] Patent Number: 5,917,260
[45] Date of Patent: Jun. 29, 1999

[54] ELECTROMECHANICAL MILLIMOTOR

[76] Inventors: Ernest J. Garcia, 823 Piedra Larga Pl., NE.; Todd R. Christenson, 1621 Speakman Dr., SE., both of Albuquerque, N.M. 87123; Marc A. Polosky, 12916 Eastridge Dr., NE., Albuquerque, N.M. 87112

[21] Appl. No.: 08/874,815

[22] Filed: Jun. 13, 1997

[51] Int. Cl.$^6$ ............................................... H02K 7/06
[52] U.S. Cl. ................... 310/80; 310/40 MM; 310/20; 74/44
[58] Field of Search ................. 310/40 MM, 80, 310/308, 309, 20; 74/44

[56] References Cited

U.S. PATENT DOCUMENTS

| | | | |
|---|---|---|---|
| 3,020,425 | 2/1962 | Steiner | 310/80 |
| 3,773,439 | 11/1973 | Sheridan | 310/20 |
| 3,805,511 | 4/1974 | Adler et al. | 310/80 |
| 4,138,897 | 2/1979 | Ross | 74/44 |
| 4,255,989 | 3/1981 | Dinelli | 74/44 |
| 4,767,955 | 8/1988 | McDaniel | 310/20 |
| 5,378,583 | 1/1995 | Guckel et al. | 430/325 |
| 5,428,259 | 6/1995 | Suzuki | 310/309 |
| 5,631,514 | 5/1997 | Garcia et al. | 310/309 |

OTHER PUBLICATIONS

Ernest J. Garcia, Jeffry J. Sniegowski, Surface Micromachine Microengine, Sensors and Actuators A 48 pp. 203–214 (1995).

H. Guckel, K. J. Skrobis, J. Klein, and T. R. Christenson, Micromechanics via X–Ray Assisted Processing, J. Vac. Sci. Technol. A 12(4), Jul./Aug. 1994.

W. Ehrfeld, F. Gotz, D. Munchmeyer, W. Schelb, D. Schmidt, LIGA Process: Sensor Construction Techniques Via X–Ray Lithography, TH0215–4/88/0000–0001, 1988 IEEE. No month.

E. W. Becker, W. Ehrfeld, P. Hagmann, A. Maner and D. Munchmeyer, Fabrication of Microstructures with High Aspect Ratios and Great Structural Heights by Synchrotron Radiation Lithography, Galvanoforming, and Plastic Moulding (LIGA process), Elsevier Science Publishers B. V. (North Holland) 1986. No month.

*Primary Examiner*—Clayton E. LaBalle
*Assistant Examiner*—B. Mullins
*Attorney, Agent, or Firm*—Kevin Lynn Wildenstein, Esq.

[57] ABSTRACT

A millimeter-sized machine, including electromagnetic circuits adapted to convert electromagnetic energy to mechanical energy, for engaging and operating external mechanical loads. A plurality of millimeter-sized magnetic actuators operate out of phase with each other to control a plurality of millimeter-sized structural elements to drive an external mechanical load. Each actuator is connected to a link. Each link, in turn, is connected to a drive pinion at another similar pivoting joint. When the magnetic actuators are energized, each drive pinion is then capable of driving a larger output gear in gear-like fashion to produce positive torque about the drive pinion center at all angular positions of the output gear.

23 Claims, 19 Drawing Sheets

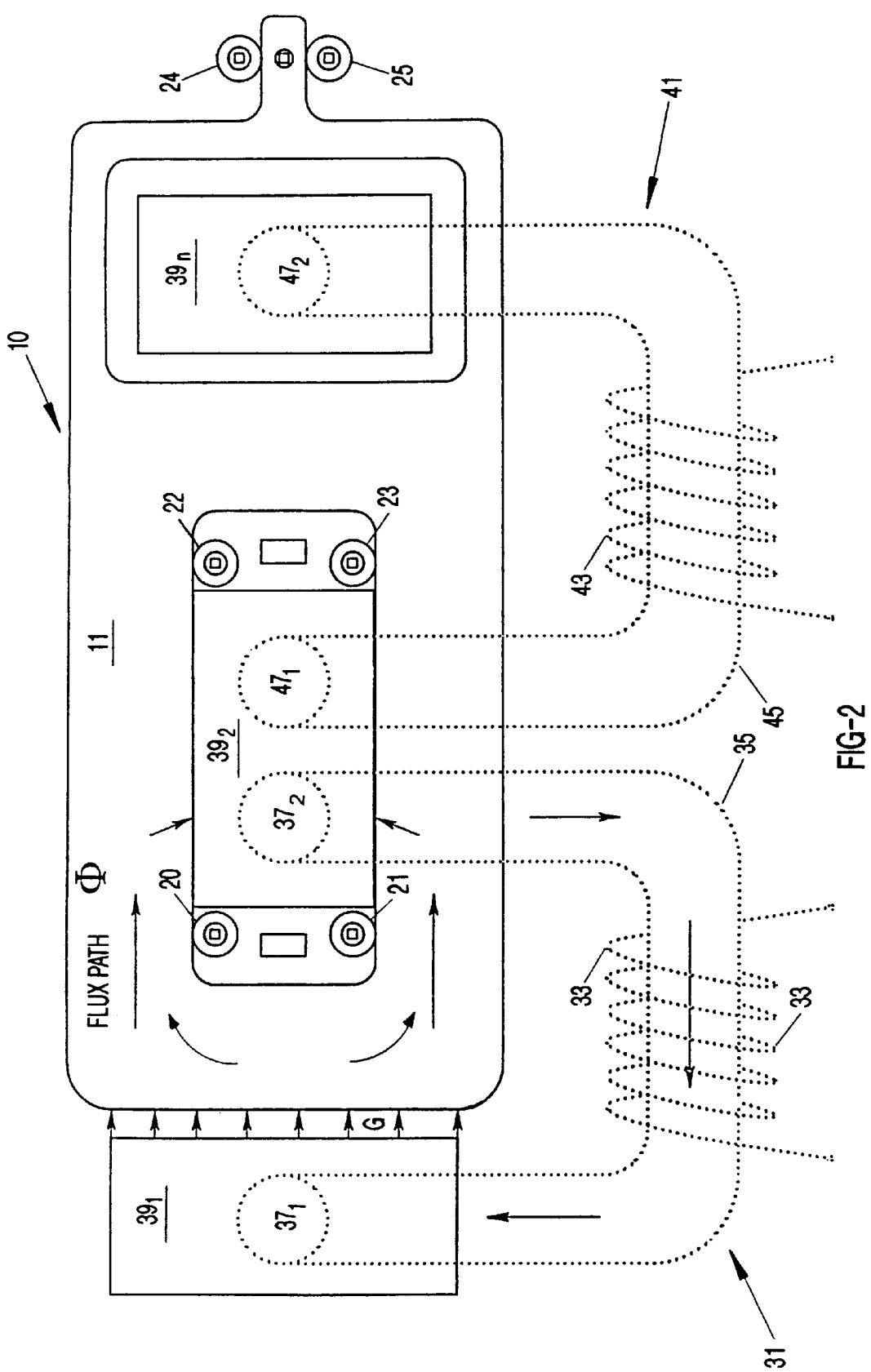

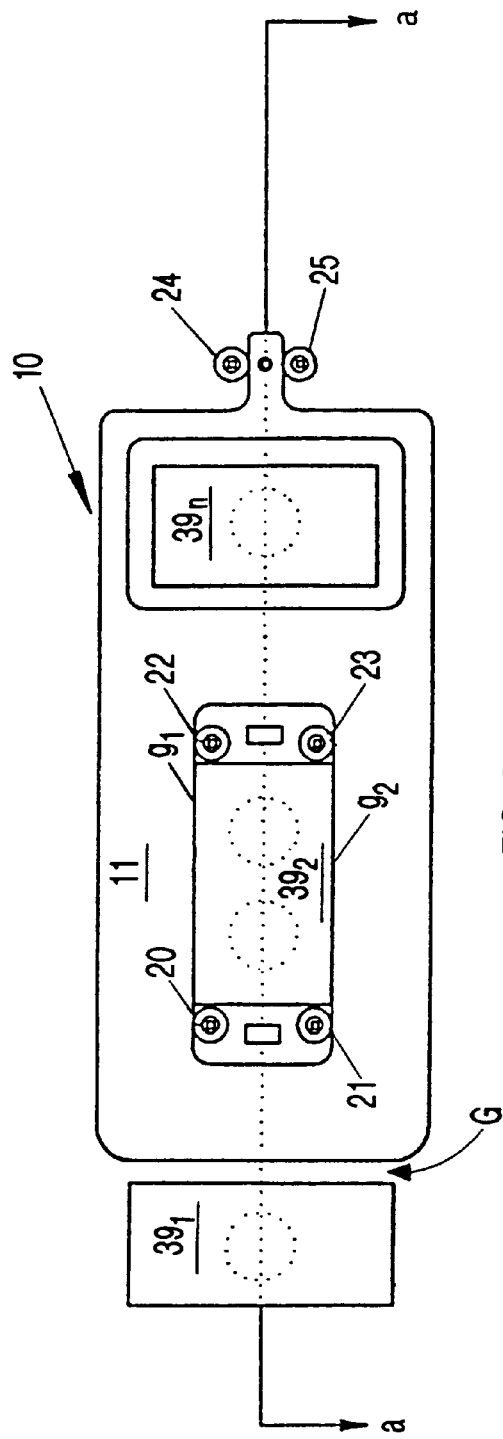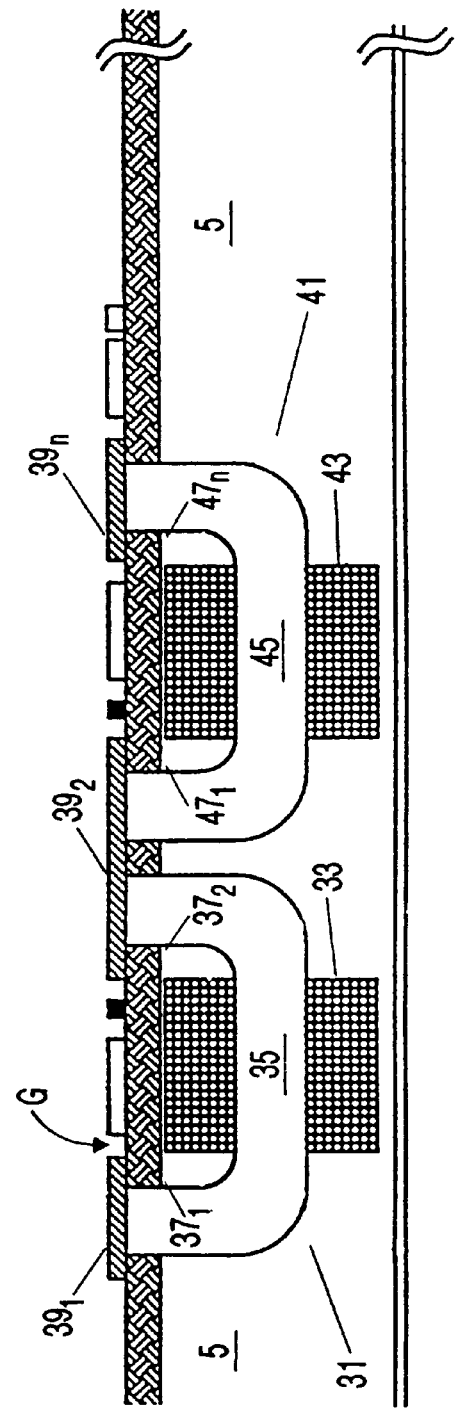
FIG-3a
FIG-3b

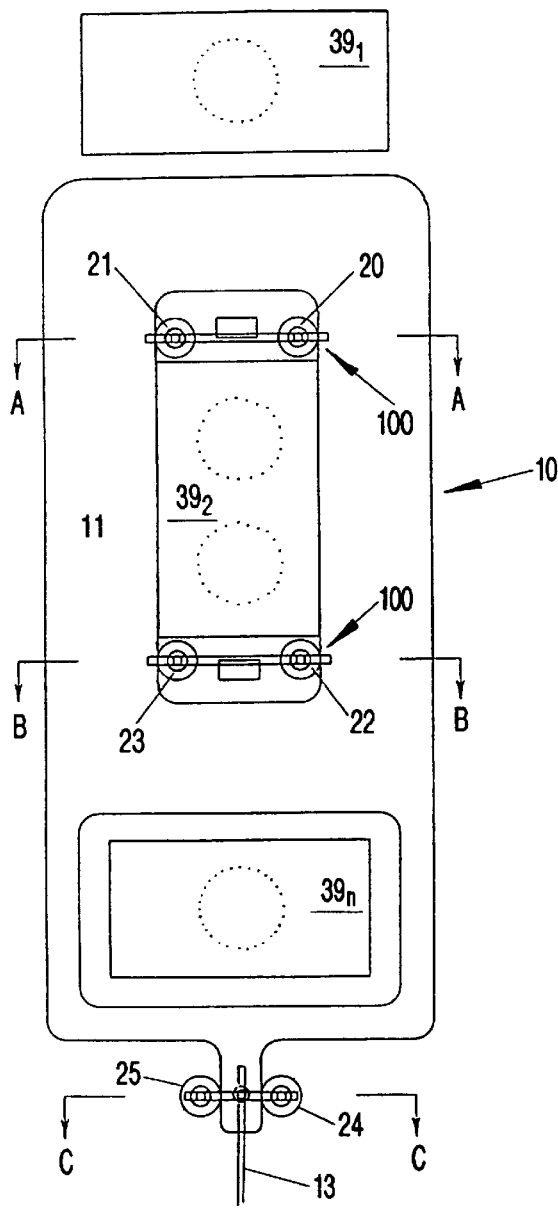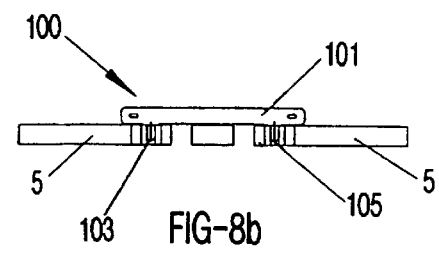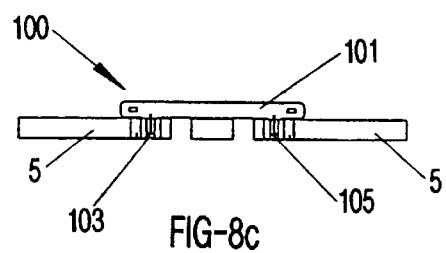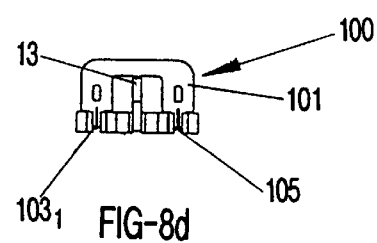
FIG-8a

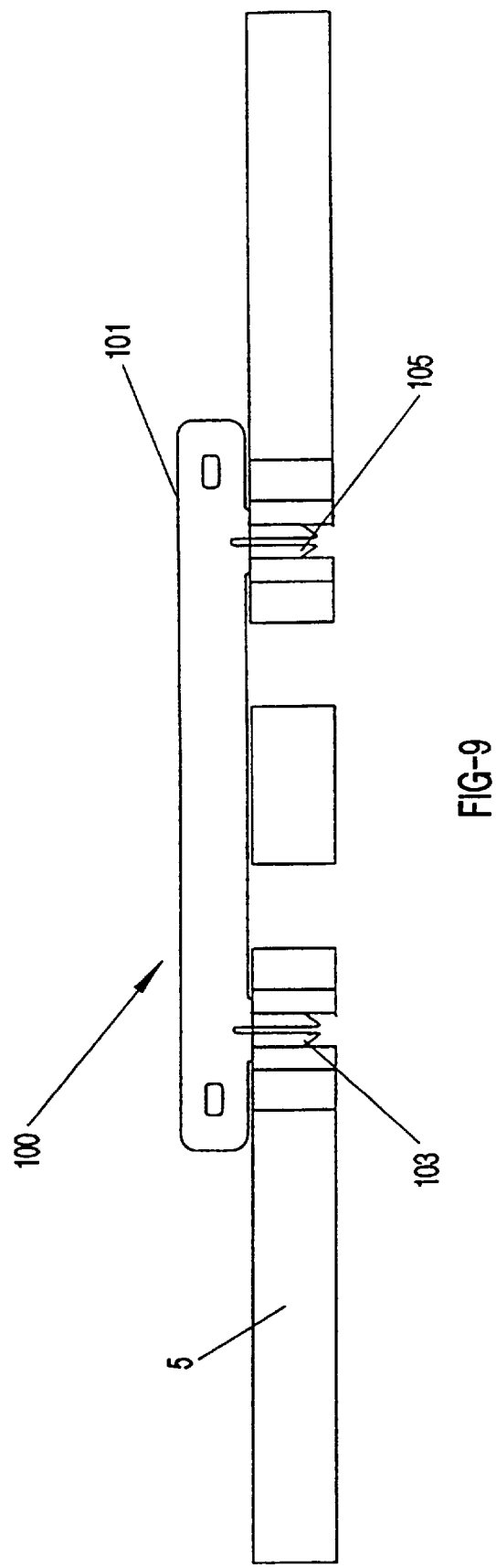

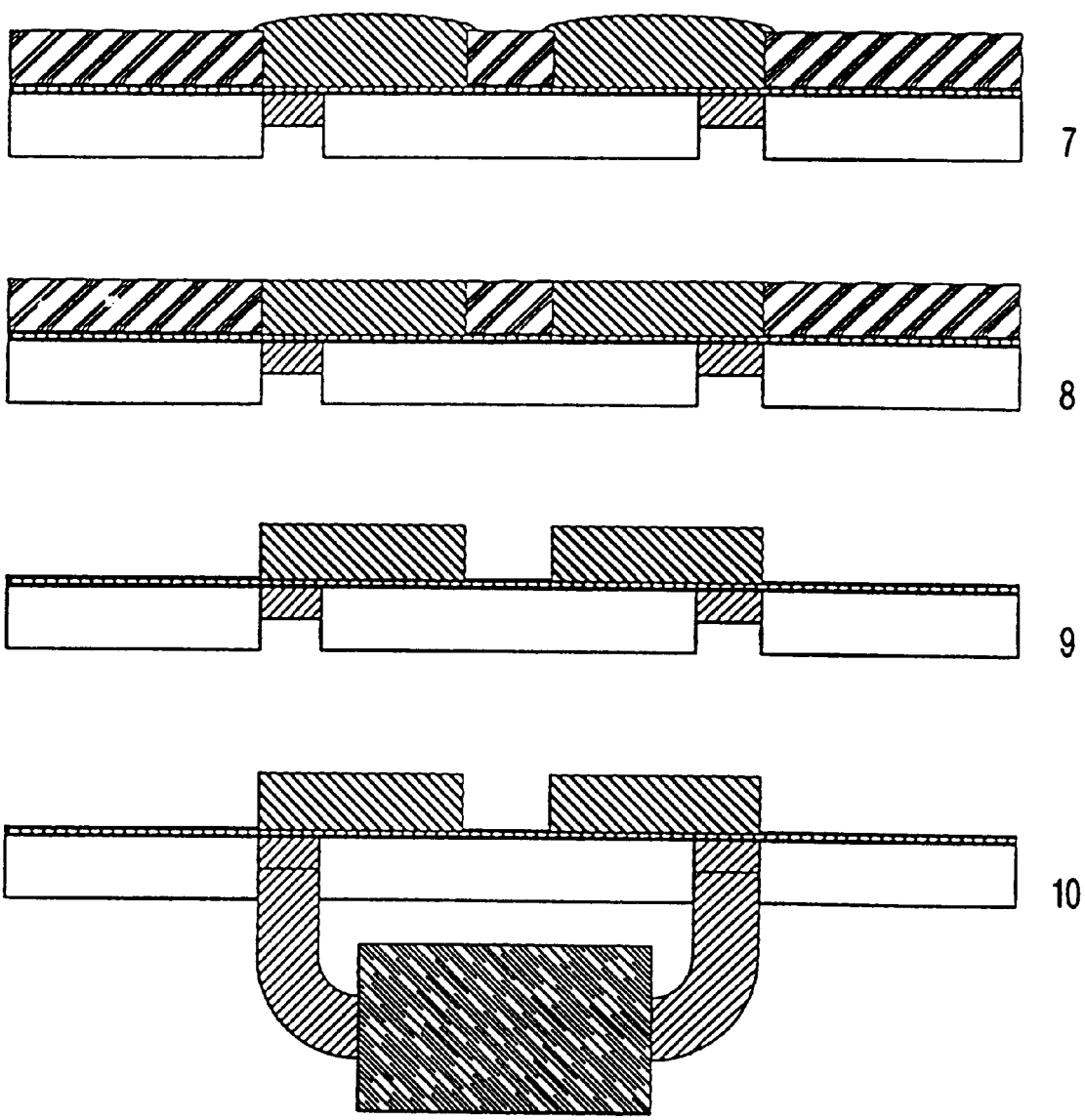
FIG-13(CON'T)

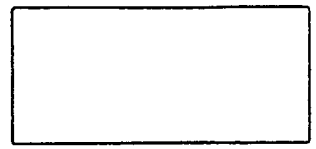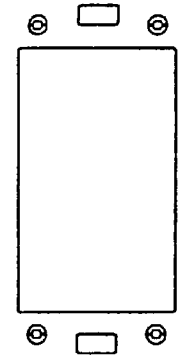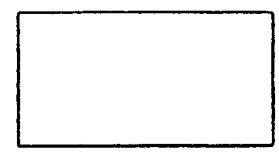
FIG-14

ELECTROMECHANICAL MILLIMOTOR

GOVERNMENT RIGHTS

This invention was made with United States Government support under Contract No. DE-AC04-94AL85000 awarded by the U.S. Department of Energy. The Government has certain rights in this invention.

BACKGROUND OF THE INVENTION

In the field of micromechanics, mechanical devices are produced which are on the scale of micrometers (i.e., approximately $1\times10^{-6}$). In particular, electrically powered micrometer-sized micro-motors (or "micro-engines" as they are known) exist which provide rotational motion in order to drive a mechanical load. While micromotors, such as disclosed in U.S. Pat. No. 5,631,514, titled "Microfabricated Microengine for Use as a Mechanical Drive and Power Source in the Microdomain and Fabrication Process," are sufficient to drive a mechanical load at micrometer scale, such devices cannot drive larger mechanical loads such as may exist in the millimeter domain (i.e., approximately $1\times10^{-3}$). While a variety of high-aspect ratio electrostatic and magnetic micro-motors have been constructed using LIGA processing ("Lithographie Galvanoforming Abforming", an acronym which evolved from the Karlsruhe Nuclear Research Center in Germany), there is a need for millimeter sized devices in situations where micromachined devices cannot provide sufficient torque because they are generally too small and where conventionally fabricated motors are not available in the millimeter scale.

Millimachinery (also known as mesoscopic machinery), as used in the present invention, refers to machining of an intermediate range of devices which fit between the dimensions of micromachined devices (which are perceivably small to the human eye) and those devices which are large enough to be conventionally fabricated. In particular, millimachined devices fill a gap which allows micromachined devices to interface with large scale, conventionally fabricated, devices. When devices are fabricated in this intermediate range, magnetic actuation provides higher energy densities than that provided by electrostatic actuation, and therefore, is one reason a magnetic actuation scheme is the preferred design. While micromachined devices may be difficult to package during manufacturing due to the small sizes inherent in such devices, millimachined devices may assist implementing micromachined devices when packaging becomes a manufacturing constraint.

Recent advances in micromachining technology (including surface micromachining and LIGA processes) permit fabrication of millimeter structures which can be used in machinery for applications which require positioning, material manufacturing (including milling, drilling and cutting), pumping, medical applications, optical switching and other applications. Each application requires mechanical power for operation. As described in the article titled "Surface Micromachined Microengine", E. J. Garcia, J. J. Sniegowski, Sensors and Actuators, A 48, pp. 203–214 (1995), recent advances in surface micromachining have lead to the development of electrostatic actuators capable of driving microscopic machinery. However, machinery that is sized several orders of magnitude larger, i.e., to the order of millimeters, cannot be powered by these recently developed surface micromachined devices. Micrometer devices are unable to produce sufficient force and/or torque to drive the larger machinery. Therefore, one of the novel features of the present invention is that it is capable of providing the required force and torque needed to drive millimachinery. Moreover, a modified LIGA process employed to manufacture millimeter sized components enables the fabrication of such components in sizes that cannot be achieved by either surface micromachining or conventional miniature machining.

The millimeter-sized invention disclosed herein differs from existing micromachined devices in several respects. First, until the present invention, devices did not exist which were fabricated by millimachining methods to achieve functional components which are both sized and operate in the millimeter range. Second, millimeter fabricated devices are capable of driving larger mechanical loads than the same number of micromachined devices. Third, unlike micromachined devices, millimeter fabricated devices are capable of generating a greater amount of torque.

It is therefore an object of the present invention to provide a milliengine machined and adapted to operate between the dimensions of smaller micromachined devices which are perceivably small to the human eye and those devices which are large enough to be conventionally fabricated.

It is a further object of the present invention to provide a milliengine adapted to convert electromagnetic energy to mechanical energy through various structural elements, for connection to an external mechanical load.

It is also an object of the present invention to provide a motor sized in the millimeter scale adapted to convert linear motion to rotary motion by use of actuators which operate out of phase with each other, to deliver positive torque to at least one output gear.

It is a further object of the present invention to disclose a motor sized in the millimeter scale which includes a plurality of electromagnetic circuits adapted to control a plurality of structural elements to drive an external mechanical load.

It is an object of the present invention to provide a electromechanical millimetersized machine adapted for precision control of external positioning, handling, aligning, sorting, sensing, cutting, slicing, material removal and pumping devices.

It is an object of the present invention to provide a electromechanical millimetersized millimachine for use in biomedical applications which require pumping performed inside a body.

It is also an object of the present invention to provide a device sized in the millimeter domain adapted to power millimeter sized valves, optical shutters, electrical switches and relays, miniature hard disk drives, miniature robotic devices, and fiber optic switching and scanning devices.

It is a further object of the present invention to provide a milliengine capable of operating and controlling any application requiring movement or application of forces or torque to millimeter or micrometer sized devices.

It is an object of the present invention to provide a electrically isolated device for use in an aqueous environment where electromagnetic power is transferred to a mechanical output through a fixed and sealed magnetic flux path that passes through a substrate from the isolated electrical elements on the backside of the substrate to the exposed mechanical elements on the top side of the substrate.

SUMMARY OF THE INVENTION

The present invention includes millimeter sized electromagnetic circuits adapted to convert magnetic energy to mechanical energy for controlling primarily millimeter mechanical components, the mechanical components adapted to control external mechanical loads.

The present invention is a single degree of freedom system, which is a system where all elements of the milliengine move in unison. In particular, a plurality of magnetic circuits control a plurality of structural elements (such as, for example, actuators, bearings, links and output gearing) to drive an external mechanical load. The actuators simultaneously move towards the left or right depending upon which magnetic circuit is energized. Each actuator is connected to a link via a pivoting joint that allows the link to rotate about the pivoting joint's z-axis. Each link, in turn, is connected to a drive pinion at another similar pivoting joint. When the magnetic circuits are energized to operate the actuators, each drive pinion is then capable of driving a larger output gear in gear-like relationship when each link is pushed or pulled by the actuators, to thereby produce positive torque about the center of the output gear. In the preferred mode, a pair of actuators are employed, each actuator operating approximately 90° out of phase with the other actuator. In turn, pinion gear pairs drive a single output gear by applying forces across the gear teeth to produce a positive torque about the output gears' center of rotation at all angular positions of the output gear.

The present invention is designed so that at any position, the net torque produced about the output gear is always positive. The torque contribution of each drive pinion to the output gear varies from $0-T_{max}$. By phasing each of the drive pinions 90° apart, the present invention ensures that the output torque of the output gear is always positive, since both drive pinions cannot be at their zero torque position at the same time. The larger output gear is then used to drive a mechanical load. As evident from the following detailed description of the invention, the present invention can use any type of millimeter-sized actuator means capable of providing reciprocating motion to drive an output gear.

Further, the conventional LIGA process only permits two dimensional (x and y coordinates) structures to be produced by photolithography methods. Because the present invention requires a third dimension (z coordinate, which represents the thickness of each structural element), a modified LIGA fabrication and assembly process is also disclosed to obtain a three-dimensional fabricated machine.

The novel features of the present invention will become apparent to those of ordinary skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of ordinary skill in the art from the detailed description of the invention and claims that follow.

BRIEF DESCRIPTION OF THE DRAWINGS

FIG. 2 illustrates magnetic circuits as disclosed in the invention illustrated in FIG. 1;

FIG. 3a is a partial top view of the primary drive means of the milliengine invention;

FIG. 3b is a side cross sectional view of FIG. 3a;

FIG. 8a is a partial top view of the primary drive means of the milliengine invention;

FIG. 8b is a cross-sectional view of FIG. 8a taken along lines A—A;

FIG. 8c is a cross-sectional view of FIG. 8a taken along lines B—B;

FIG. 8d is a cross-sectional view of FIG. 8a taken along lines C—C;

FIG. 9 is an expanded view of FIG. 8b;

FIGS. 13-1 through 13-10 illustrate the present invention's fabrication process;

FIG. 14 is a representative top view of a substrate which undergoes the fabrication process shown in FIGS. 13-1 through 13-10;

DETAILED DESCRIPTION OF THE INVENTION

Figure 1:
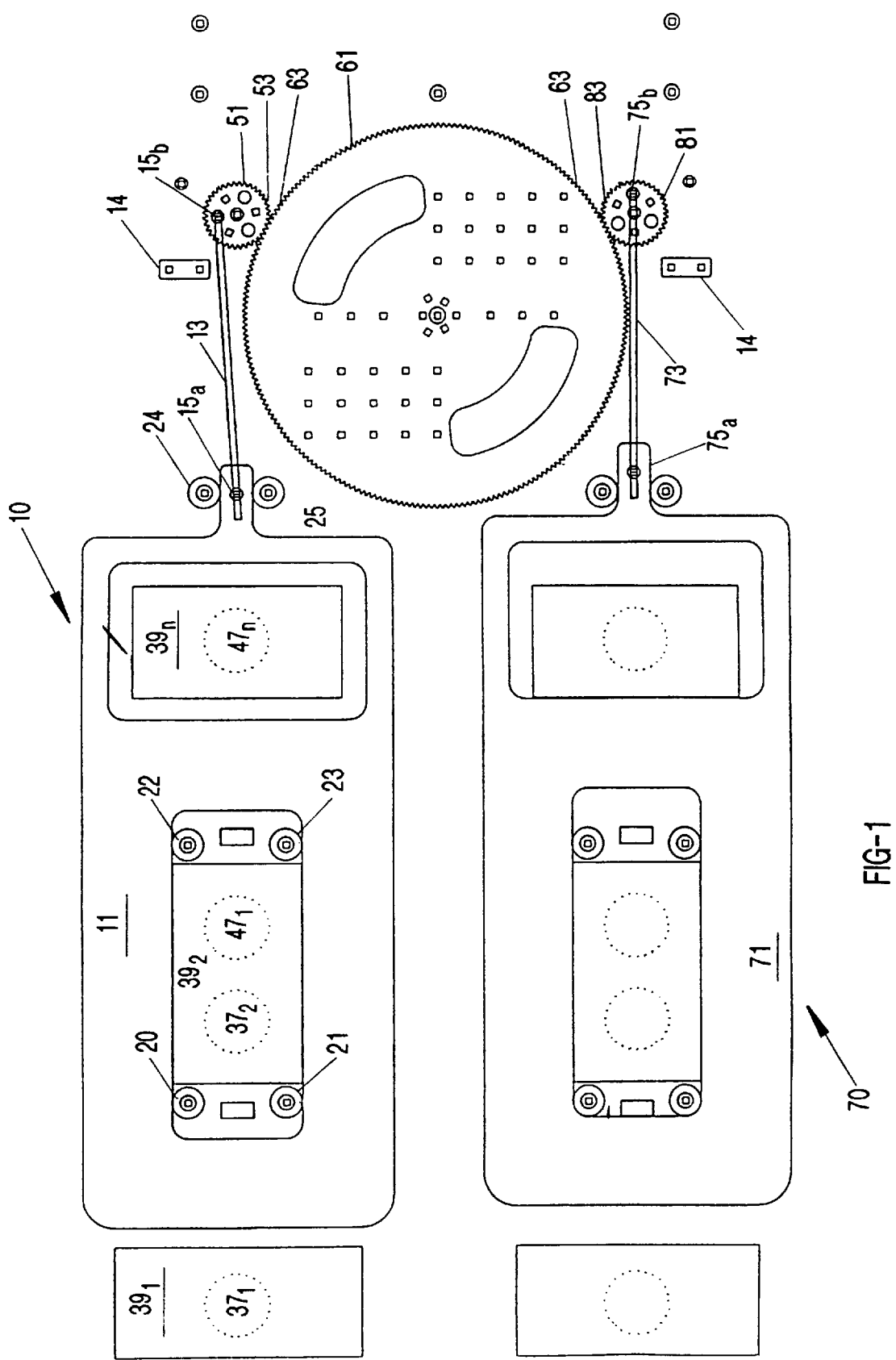
FIG. 1 illustrates a top view of the milliengine of the present invention.

As seen in FIG. 1, the present invention includes a primary drive means 10 and a secondary drive means 70 formed upon a substrate base 5, that when employed in unison, are adapted to engage and provide torque to output gear 61 similarly formed on substrate 5. Initially, it is noted that reference to the terms "primary" and "secondary" are illustrative only and are not terms of limitation.

Primary drive means 10 includes stators $39_1$, $39_2$, $39_n$, roller bearings 20–23, first magnetic circuit 31, second magnetic circuit 41 and primary actuator 11. It will be apparent to those of ordinary skill in the art that other types of actuators can also be used for these applications such as, electrostatic actuators, electromagnetic actuators, thermal actuators, shape memory alloy actuators, phase-change-based actuators, piezoelectric actuators and similar devices.

Figure 4A:
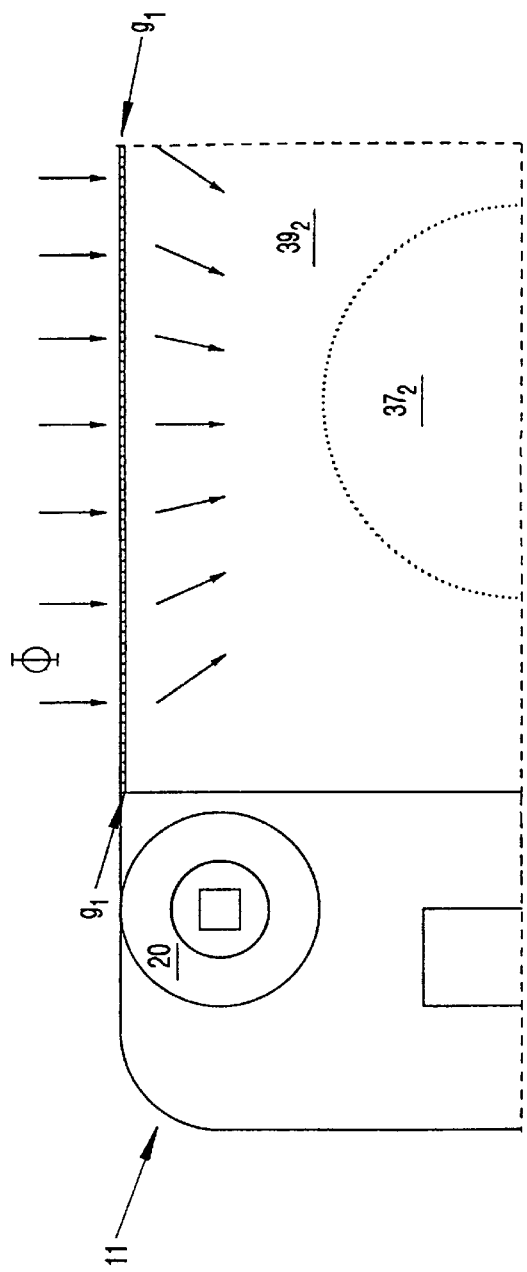
FIG. 4a is a partial expanded view of the primary actuator disclosed in the present invention.
Figure 4B:
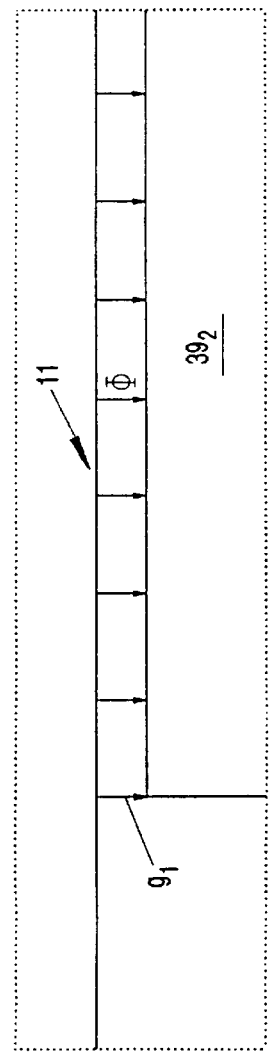
FIG. 4b is a expanded partial view of FIG. 4a, illustrating variable air gap $g_1$.

Primary drive means 10 is controlled by the alternating operation of first magnetic circuit 31 and second magnetic circuit 41 (both seen in FIGS. 3a and 3b). Primary actuator 11 is designed to move coordinately left or right depending upon the operation of first magnetic circuit 31 and second magnetic circuit 41. As seen in FIG. 2, first magnetic circuit 31 includes first electrically conductive coil 33 which winds around first circular core 35. When current is applied to first conductive coil 33, a magnetomotive force is produced in first magnetic circuit 31. As seen in FIGS. 3a and 3b, first coil 33 is preferably positioned under substrate 5 of the present invention. The core of first coil 33 is electrically connected to the remainder of first magnetic circuit 31 through a plurality of openings $37_1$–$37_2$ in substrate 5. Openings $37_1$–$37_2$ permit first core 35 to be positioned so that each end of first core 35 are in direct contact with stators $39_1$–$39_2$. As seen in FIG. 2, the magnetic flux φ produced when current is applied to first coil 33 is illustrated. The magnetic flux path passes through the core of first coil 33 into stator $39_1$. The flux path then flows across air gap G into primary actuator 11. Because primary actuator 11 is designed to move coordinately left or right, the dimension of air gap G varies. The flux path then divides into parallel paths through primary actuator 11 to regions of fixed air gaps $g_1$ and $g_2$ ($g_1$ is seen in FIGS. 4a and 4b; $g_2$ is the same variable gap that exists on the opposite portion of stator $39_2$ as seen in FIG. 3a). The flux path then flows across fixed air gaps $g_1$ and $g_2$ to central stator $39_2$. Fixed air gaps $g_1$ and $g_2$ are a fixed distance since roller bearings 20–25 (shown, for example, in FIG. 4a) only permit motion of primary actuator 11 in the x coordinate direction. Ideally, fixed air gaps $g_1$ and $g_2$ are designed to be as small as possible to reduce reluctance.

FIGS. 4a and 4b illustrate a partial expanded view of the fixed gap region, illustrating the flow of flux φ through primary actuator 11, central stator $39_2$ and roller bearing 20. From central stator $39_2$, the flux φ flows back into the core of first coil 35 (not shown in FIGS. 4a or 4b) via opening $37_2$ to complete the magnetic circuit. The EMF force developed between central stator $39_1$ and primary actuator 11 is an attractive force, being proportional to the magnetomotive force squared, and is approximately proportional to the inverse of the square of the spacing of variable air gap G. Similarly, the EMF force developed between central stator $39_2$ and primary actuator 11 is an attractive force, being proportional to the magnetomotive force squared, and is approximately proportional to the inverse of the square of the spacing of fixed air gaps $g_1$ and $g_2$. However, this EMF force does not enable primary actuator 11 to operate in a controlled axial direction. Rather, to overcome this force, a plurality of roller bearings 20–23 are employed to control the lateral movement of stator $39_2$ to prevent it from contacting actuator 11. With this design, first magnetic circuit 31, when energized, is able to drive primary actuator 11 to the left.

Conversely, as seen in FIG. 2, second magnetic circuit 41 is adapted to drive primary actuator 11 to the right. As seen in FIGS. 3a and 3b, second magnetic circuit 41 includes second electrically conductive coil 43 which winds around second circular core 45. When current is applied to second coil 43, a magnetomotive force is produced in second magnetic circuit 41. As seen in FIG. 3b, second coil 43 is preferably positioned under substrate 5 of the present invention. The core of second coil 43 is electrically connected to the remainder of second magnetic circuit 41 through a plurality of openings $47_1$–$47_2$ in substrate 5. Openings $47_1$–$47_2$ permit second core 45 to be positioned so that each end of second core 45 are in direct contact with stators $39_2$ and $39_n$.

Those of skill in the art will now appreciate that the magnetic flux φ produced when current is applied to second coil 43 is similar to that described above when current is applied to first coil 33. By controlling the operation of first and second drive coils 33, 43 alternately, primary actuator 11 is capable of movement both to the left and to the right. With this coordinate axial motion, primary actuator 11 is capable of engaging and operating primary link 13 to produce motion in primary drive pinion 51 and output gear 61.

Returning to FIG. 1, primary actuator 11 is coupled to elongated primary link 13 through primary pivoting joint 15a. Primary pivoting joint 15a allows primary link 13 to move in the x and y plane while also allowing link 13 to rotate about the pivoting joint 15a's z-axis. At its other end, primary link 13 is connected to primary drive pinion 51 by primary pivoting joint 15b and is likewise capable of rotation about the z-axis of pivoting joint 15b. In gear-like relationship, primary drive pinion 51 is adapted to engage and drive larger output gear 61 when primary link 13 is engaged and operated by primary actuator 11 to produce positive torque about the center of drive pinion 51.

As seen in FIG. 1, secondary drive means 70 includes a secondary actuator 71 is connected to secondary link 73 in rotatable relationship by primary pivoting joint 75a. As those of skill in the art will realize, secondary drive means 70 is controlled by a third magnetic circuit and a fourth magnetic circuit which are not shown, but operate in substantially similar fashion as first and second magnetic circuits 31, 41. However, secondary actuator 71 is designed to operate out of phase with primary actuator 11, and preferably, operate approximately 90° out of phase with actuator 11.

In corresponding fashion, secondary link 73, secondary pivoting joints 75a, 75b and secondary drive pinion 81 function analogously to their counterpart components found in primary drive means 10. Therefore, exactly like primary actuator 11, secondary actuator 71 is designed to move axially left or right depending upon the operation of the third and fourth magnetic circuits (not shown). Consequently, those of skill in the art can replicate secondary drive means based on the disclosure and drawings provided herein with respect to primary actuator 11 without undue experimentation to know that the "push" or "pull" action of secondary actuator 71 on secondary link 73 produces a positive torque about secondary drive pinion 81. Further, those of skill in the art will realize that any number of millimeter-sized drive means, links, pivoting joints and drive pinions can be utilized to produce a positive torque on any number of millimeter-sized output gears.

Figure 5:
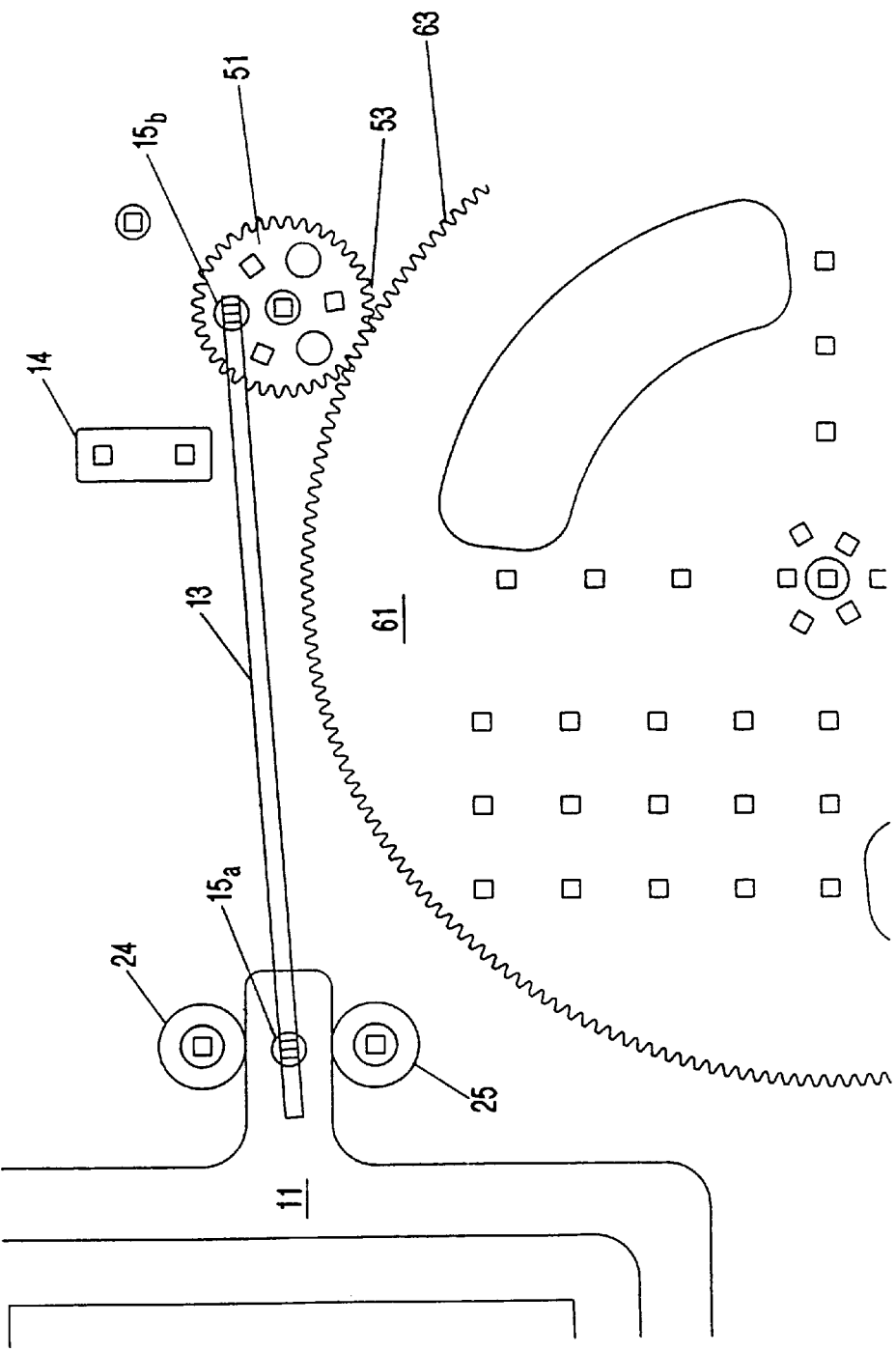
FIG. 5 illustrates the gear interrelationship between a pinion gear and an output gear of the present invention.

Both primary and secondary pinion gears (51 and 81) drive output gear 61 by applying forces across gear teeth 53, 63 (as seen, for example, in FIG. 5) and 83,63 to produce a positive torque about the output gears' center of rotation. The force contribution of each drive pinion to the driven gear varies and is a function of position. The present invention is designed so that at any angular position of output gear 61, the net torque produced about the center of output gear 61 is always positive. This is accomplished by phasing the operation of first and secondary drive pinions 51, 81 out of phase with respect to each other, and preferably, approximately phase shifted 90° with respect to each other.

Figure 5A:
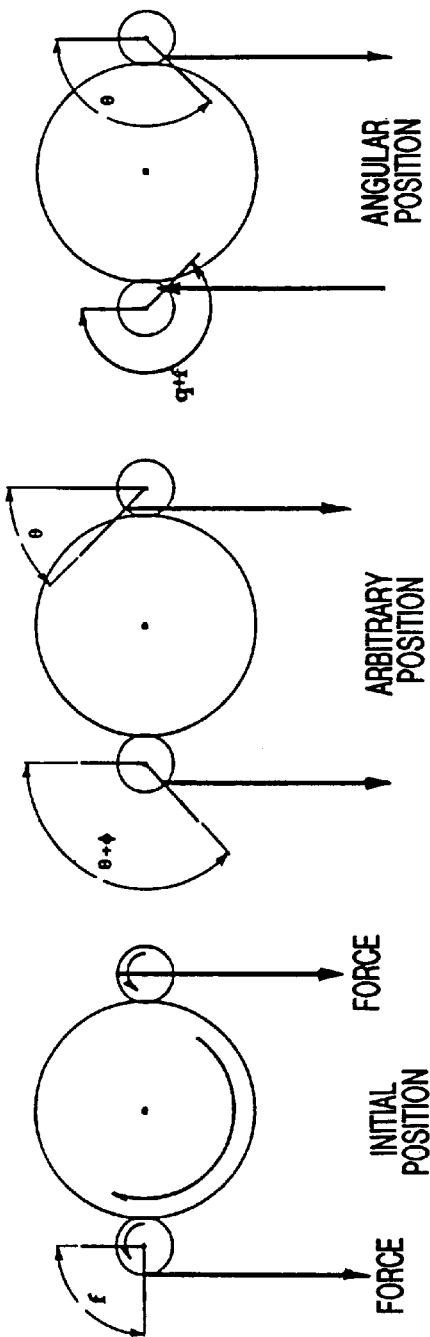
FIGS. 5a–5d are graphical illustrations of the relationship of position and force contribution of each drive pinion to a driven output gear.
Figure 5D:
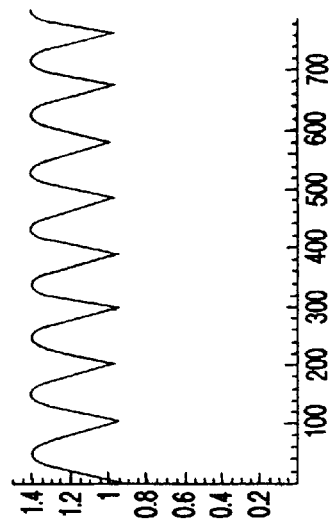
Figure 5C:
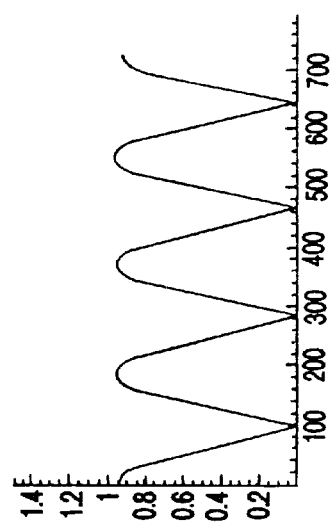
Figure 5B:
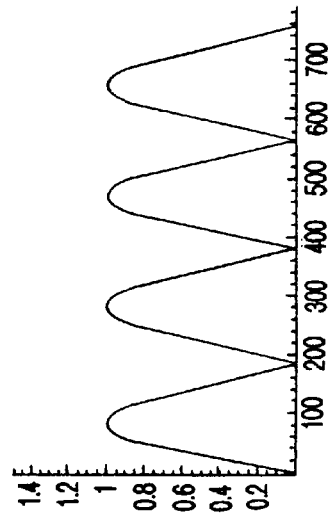

The torque contribution of each of the drive pinions 51, 81 to the output gear 61 varies from 0–$T_{max}$. By phasing first and secondary drive pinions 90° apart, the torque of output gear 61 is always positive since both drive pinions cannot be at their zero torque position at the same time. Graphically, this relationship is illustrated in FIGS. 5a–5d. The ratio of the diameter of the output gear to the pinion diameter ($d_o/d_p$) is the gear ratio. A value for the output gear torque can be calculated by multiplying the gear ratio by the input gear torque. Therefore the output gear torque $T_o=GR(T_{p1}+T_{p2})$ where the p1 and p2 refer to the two pinions. Assuming a constant input force F, the torque produced about the pinion gear center due to the applied force is F r sin(angle), where r is half the pinion diameter. The total torque about the output gear center is then $T_o$=GR F r(sin(angle1)+sin (angle2)). Since the sine function at angles q=0° and 180° is zero the pinion torque at those angles is zero. By offsetting the angular locations where the force is applied to the pinion gears, the total output gear torque can always be nonzero. The angle f is the phase angle between the two pinion gears. Therefore, the total torque is given as $T_o$=GR F r(sin(q+f)+ sin(q)). In FIG. 5a, the phase angle shown is 90°. The 3 function plots as shown in FIGS. 5b, 5c and 5d are normalized (GR=1, r=1, F=1), representing the first pinion torque, second pinion torque, and the total output gear torque as a function of angle, respectively. These plots illustrate how non zero torque is obtained by appropriate phasing. For additional input pinions the phase angle would be 180°/N, where N=no. of pinions. Consequently, those skilled in the art will appreciate that output gear 61 can then be used to drive a larger (or smaller) mechanical load by operating any number of calibrated drive pinions to achieve positive torque about the center of the output gear.

Figure 6A:
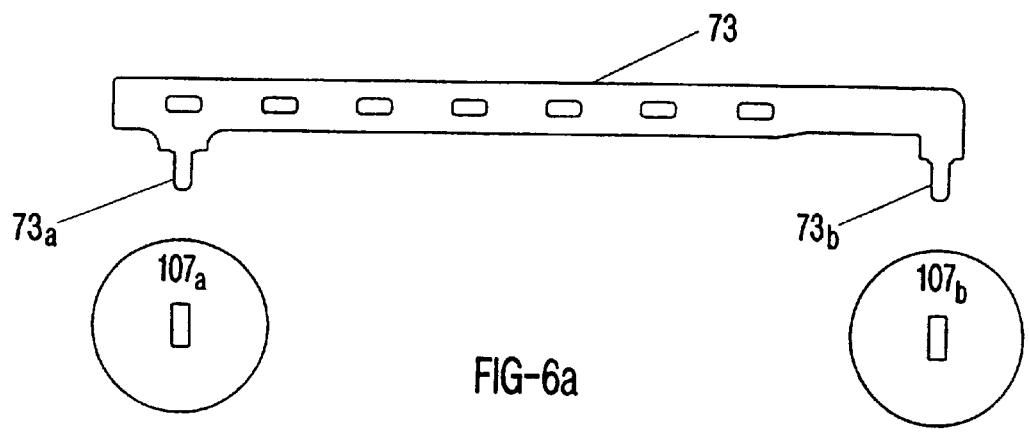
FIG. 6a illustrates a fabricated two dimensional linkage assembly used in the present invention.
Figure 6B:
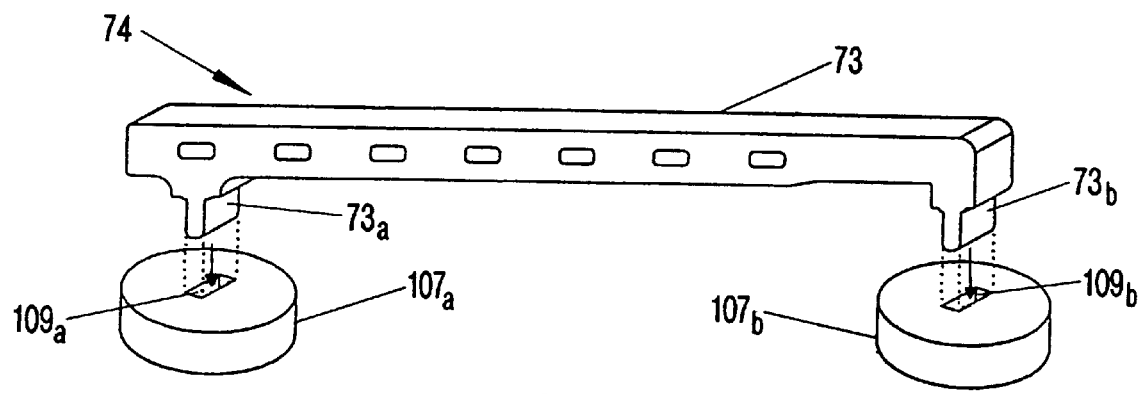
FIG. 6b illustrates the linkage assembly of FIG. 6b when in a three dimensional arrangement.

FIGS. 6a–17 illustrate the method developed to create three dimensional structures from two dimensional fabricated parts utilizing a modified LIGA process. In particular, FIG. 6a illustrates linkage assembly 74 which includes a U-shaped, elongated link 73 and a plurality of bearing elements 107a, 107b which are conventionally fabricated on a substrate as two dimensional parts. Link 73 includes a first bearing attachment means 73a at one end, and at the other end is formed a second bearing attachment means 73b. Each bearing element 107a, 107b are generally circular in shape and includes channels 109a, 109b formed therein which are adapted to receive bearing attachment means 73a, 73b. By physically rotating link 73 90° from its original plane of fabrication, and thereafter inserting first and secondary bearing attachment means 73a, 73b into channels 107a, 107b, a three dimensional linkage assembly 74 is created. Bearing attachment means 73a, 73b are dimensioned so as to fit within predefined circular apertures formed in the pinion gear and in the drive means as to allow for transfer of force from linear actuator 71 to drive pinion 81. As such, those of skill in the art will realize that the rotatable relationship between the bearing attachment means and the apertures effectively function as a pivoting joint.

Figure 7A:
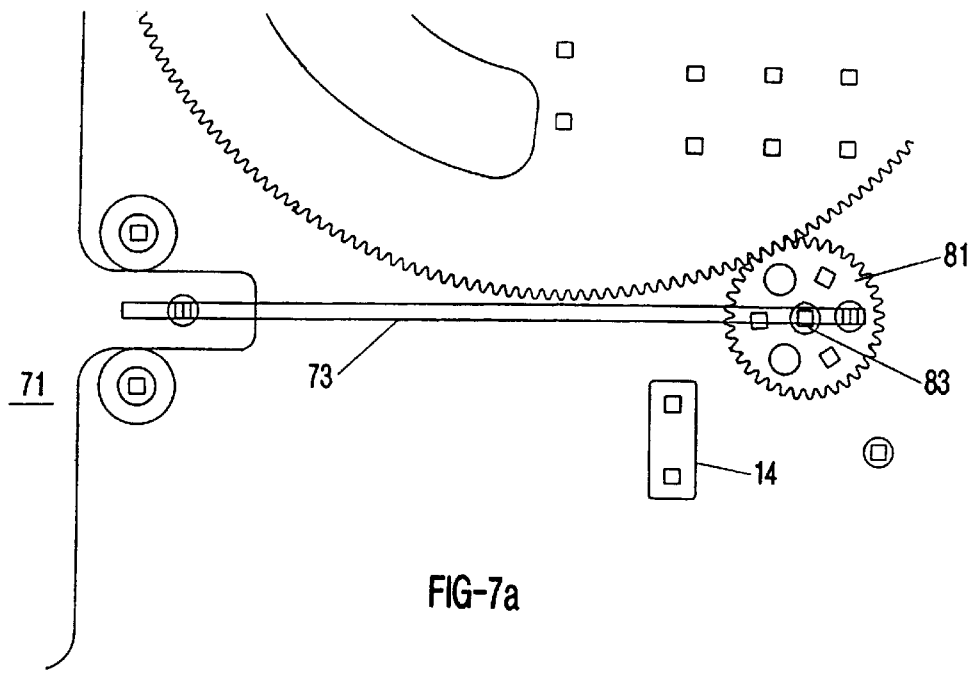
FIG. 7a is a partial top view of the present invention illustrating an embodiment of the means for retaining of the present invention.
Figure 7B:
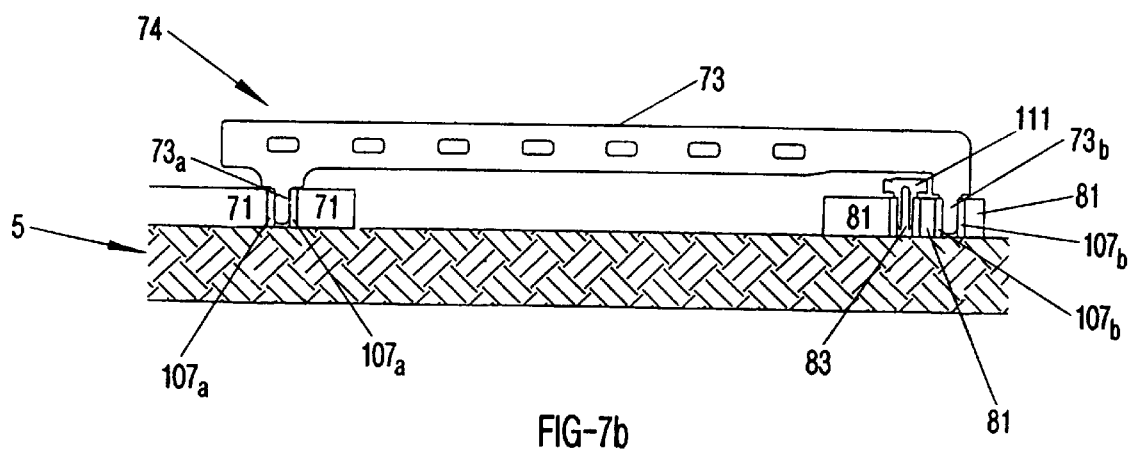
FIG. 7b is a cross sectional view of the linkage assembly illustrating the linkage of the drive means to the pinion gear as disclosed in the present invention.

FIGS. 7a and 7b illustrate the use of linkage system to assist in the transfer of force from linear actuator 71 to drive pinion 81. In particular, FIG. 7b illustrates a cross-sectional view of the arrangement in FIG. 7a when the link is rotated into a three dimensional arrangement. In this embodiment, a flexible two dimensional clip 111 is inserted into a shaft 83 formed in the center of drive pinion 81 to retain drive pinion 81 to substrate 5 while still allowing free rotation of pinion 81. Then, the linkage assembly 74 is inserted at one end into an aperture in actuator 71. At its other end, the linkage assembly 74 is inserted into an aperture in drive pinion 81. In this fashion, the linkage assembly 74 permits transfer of force from linear actuator 71 to drive pinion 81. Consequently, the same type of methodology can be employed to link all drive pinions to all actuators.

Figure 10:
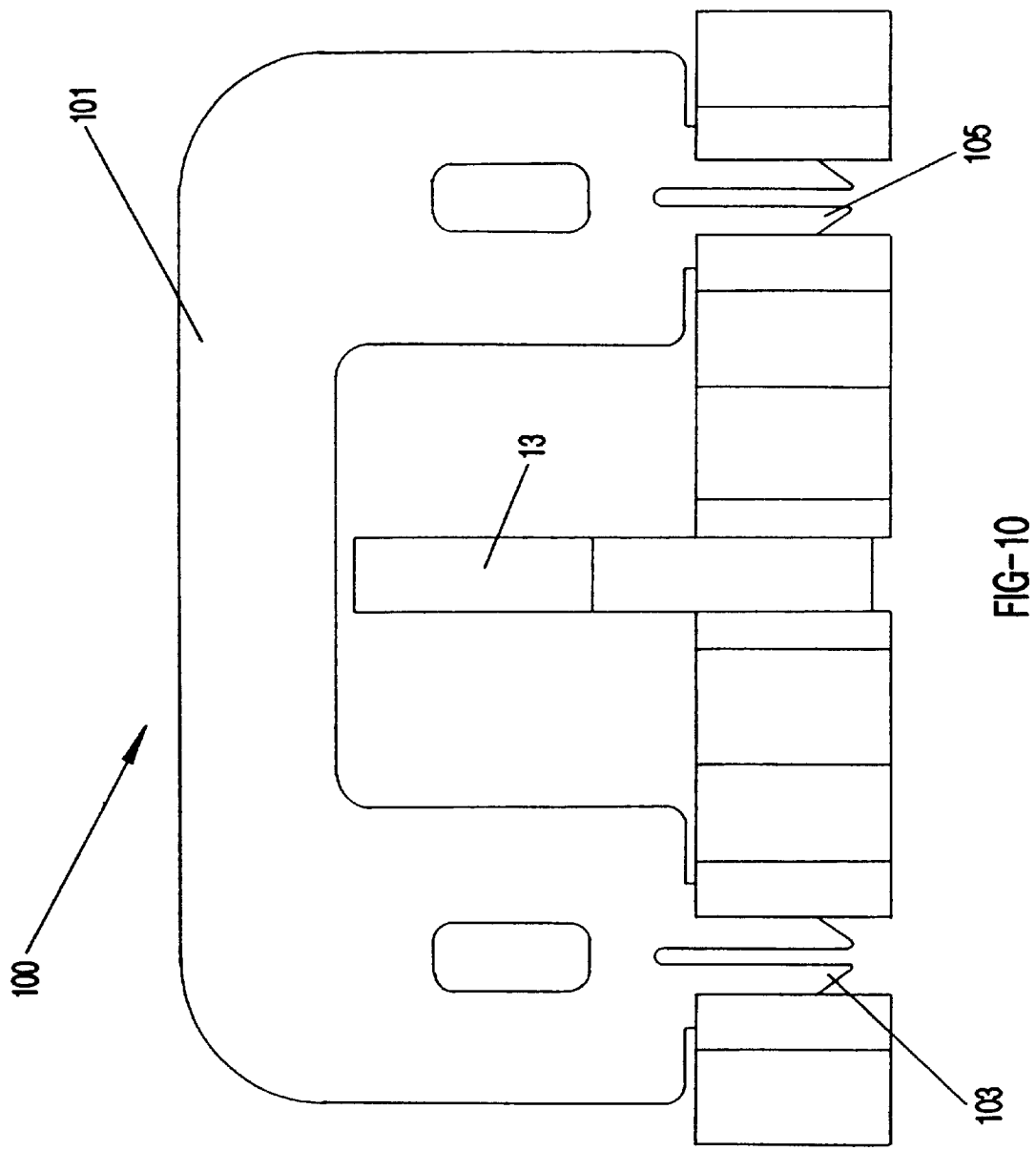
FIG. 10 is an expanded view of FIG. 8d.

As seen in FIGS. 8a–8d, primary actuator 11, roller bearings 20–26, and primary link 13 are all secured to substrate 5 by means for retaining 100. Each means for retaining 100 can be described as an elongated, U-shaped structure 101 having retaining clips 103, 105 adjacent to or at each end. Each means for retaining 100 can be modified to suit the component to be retained and still remain within the scope of the present invention. For example, FIGS. 8b, 8c and 9 depict links 101 adapted to retain roller bearings 20, 21 and 22, 23 to substrate 5. In this design, link 101 is inserted into the roller bearing shafts. Each link 101 is retained to substrate 5 by use of elastic clips 103, 105 which deform when inserted into any opening on substrate 5 adapted to receive the clip, to provide a secure attachment. Similarly, FIGS. 8d and 10 depict a similar means for retaining 100 adapted to retain roller bearings 24, 25 to substrate 5.

Figure 11:
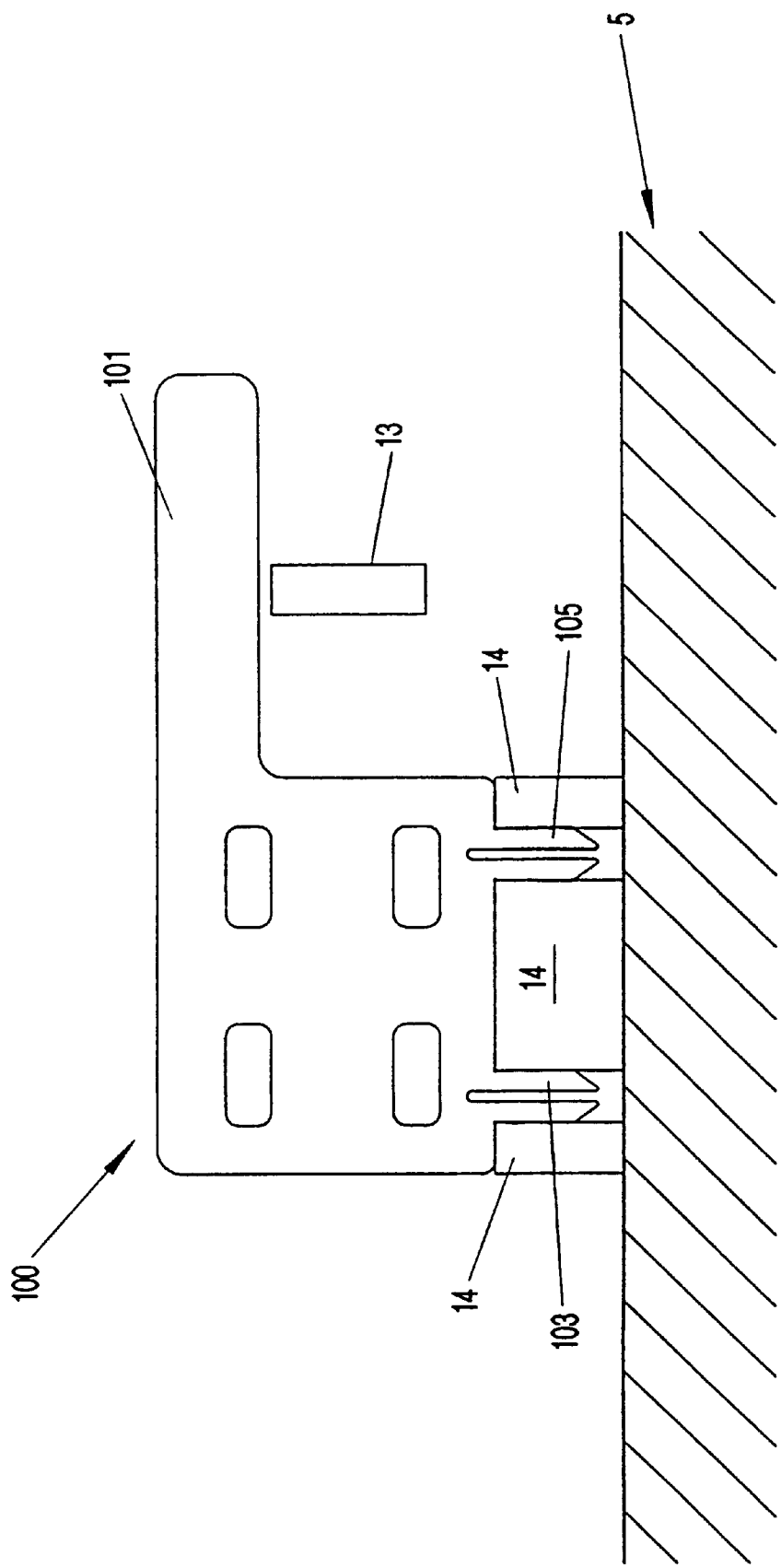
FIG. 11 illustrates another embodiment of the means for retaining disclosed in the present invention.

FIG. 11 depicts another embodiment of means for retaining 100 used to retain link 13 to pinion 51 without disengagement from substrate 5. In this embodiment, stator elements 14 having rectangular openings are formed on substrate 5. When used, the stator element openings are adapted to securely receive retainer 101's elastic clips 103, 105. In this regard, primary link 13 is held in coordinate position so that it cannot be dislodged from its placement or disengaged. Clearly, those of skill in the art will now appreciate how to use similar means for retaining to retain certain structural elements to the milliengine substrate.

Figure 12:
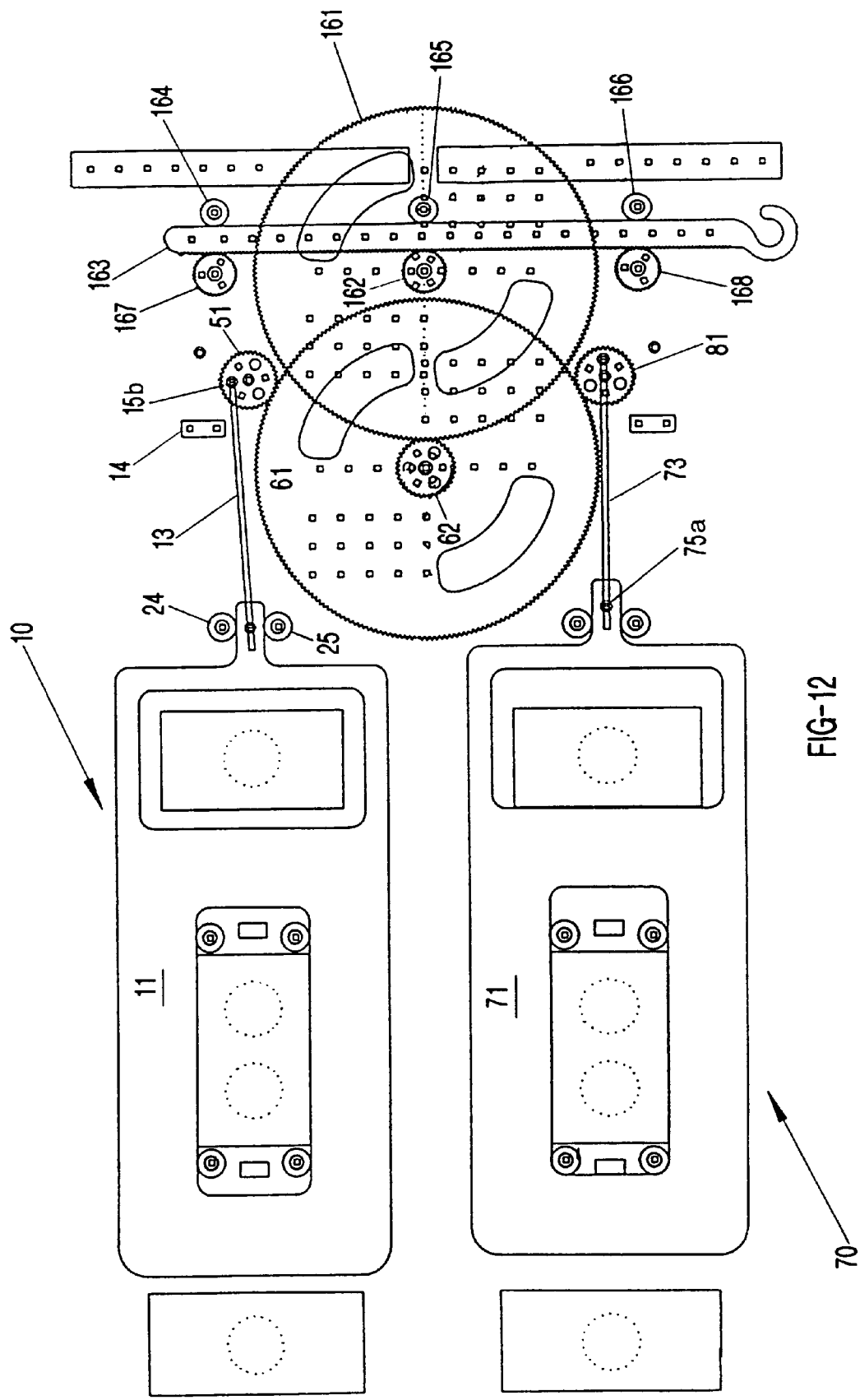
FIG. 12 illustrates the present invention when designed for use as a gear redactor.

The present invention is intended to be used in a variety of applications. For example, as seen in FIG. 12, the present invention is used in an application with a gear reductor which drives a rack and pinion to produce rotational motion on second output gear 161. In this embodiment, pinion gear 62 is mounted on top of output gear 61 and held in place by a means for retaining which fixes pinion gear 62 to the top of output gear 61. Output gear 61 and pinion gear 62 rotate about the same shaft fixed to substrate 5. To prevent these elements from disengaging from substrate 5, means for retaining 100 is employed, but in this embodiment, utilizes longer retaining clips to accommodate the increased thickness of the two parts. A second output gear 161 is attached to a fixed shaft on substrate 5 and meshes with pinion gear 62. Second drive gear 161 is fixed to second pinion gear 162 by a means for retaining 100, but in this embodiment, second output gear 161 is positioned above second pinion gear 162.

In operation, second output gear 161 and second pinion gear 162 are adapted to rotate when driven by pinion gear 62. Rack 163 is driven by second pinion gear 162 located beneath second output gear 161 and is guided by a plurality of roller bearings (164, 165, 166) and two pinions (167, 168). In this fashion, rack 163 passes underneath second output gear 161, while pinion 62 and second drive gear 161 are both located above all other elements in this system. This embodiment, therefore, provides a gear reductor unit which increases available torque by the gear reduction ratio. The gear reductor in this case is used to drive an element configured to produce linear motion in rack 163. This gear reductor can also be used to drive other mechanisms requiring rotary motion or can be configured to drive any general mechanical load.

The LIGA process and the use of PMMA (polymethyl methacrylate) as a photoresist is described, for example, in U.S. Pat. No. 5,378,583, Formation of Microstructures Using a Preformed Photoresist Sheet of Guckel et al., a paper entitled Micromechanics Via X-ray Assisted Processing by Guckel et al. (published in J. Vac. Sci. Technol. A, Vol. 12, No. 4 (July/August 1994)), a paper entitled LIGA Process:

Sensor Construction Techniques Via X-Ray Lithography by Ehrfeld et al. (reprinted from Rec. of the IEEE Solid-State Sensor and Actuator Workshop, pp. 1–4 (1988)), and a paper entitled Fabrication of Microstructures with High Aspect Ratios and Great Structural Heights by Synchrotron Radiation Lithography, Galvanoforming, and Plastic Moulding (LIGA Process) by Becker et al. (published in Microelectronic Engineering, pp.35–56 (1986)). The micro-devices described herein can be fabricated using micro- and milli-machining processes such as LIGA.

Figure 13:
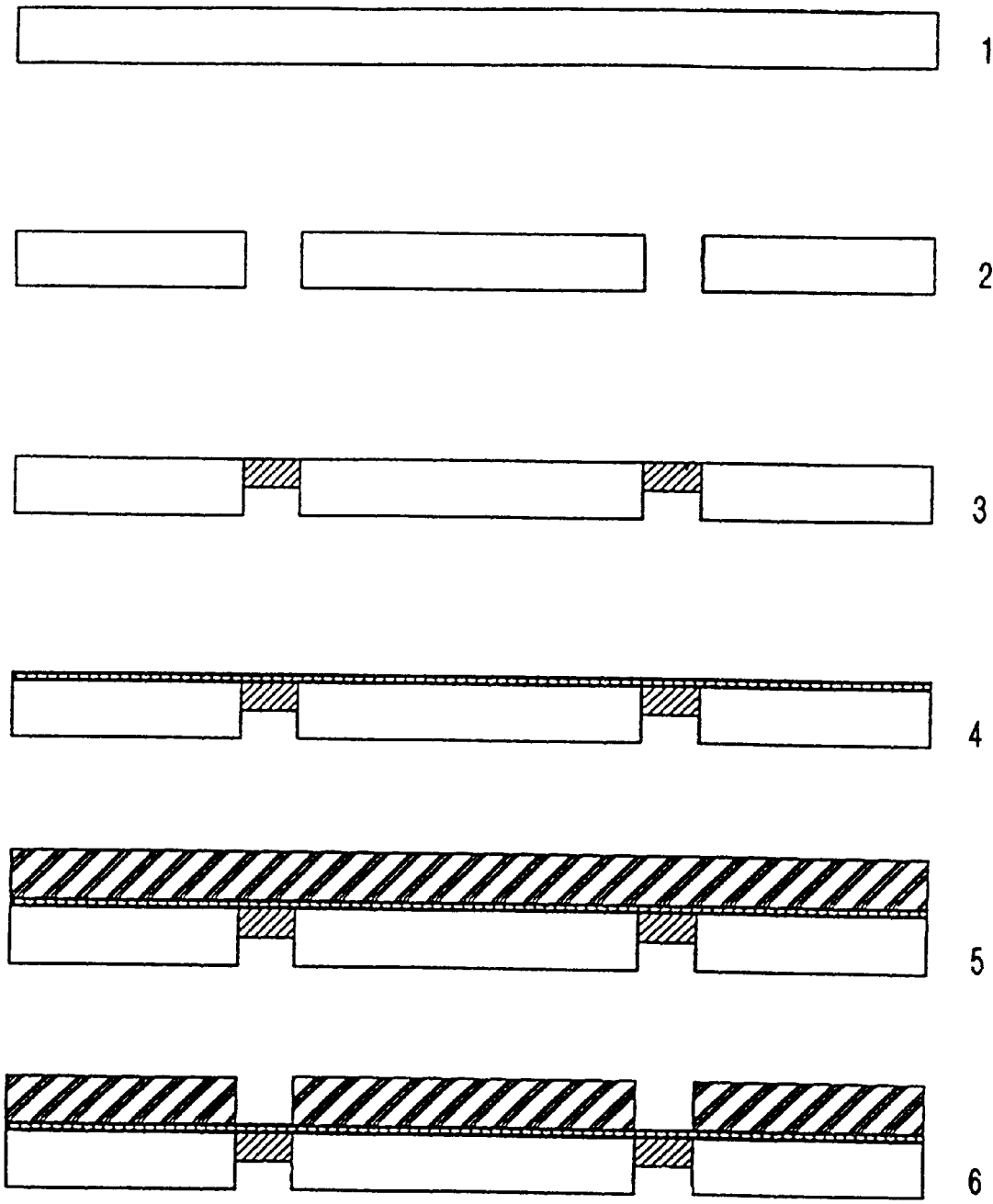

FIG. 13 illustrates one process flow used to fabricate the stator elements. The process begins with suitable preparation of a substrate (FIG. 13-1) which acts as the base upon which the stator elements will be fabricated. Preferable substrate materials include any non-magnetic material (e.g., silicon, glass, alumina) or other non-magnetic metal (e.g., copper). Holes are drilled through the substrate (FIG. 13-2) in appropriate locations to serve as feed-throughs for the magnetic flux introduced from the backside of substrate 5 by magnetic coils to operate the actuators as shown in FIGS. 1—3. Soft magnetic plugs are then inserted into the drilled holes to mechanically seal the top side of the substrate from the bottom of the substrate. The plug thickness is a fraction of the substrate thickness so the coil core ends can be inserted into the holes (FIG. 13-3). The substrate is then cleaned and a plating base is then sputtered (e.g., 250 Å titanium: 500 Å copper: 250 Å titanium, FIG. 13-4). A PMMA sheet is then bonded to the substrate surface (FIG. 13-5) and serves as the photoresist for X-ray exposure. The PMMA is next patterned by exposure to appropriate X-ray radiation which is capable of exposing PMMA to depths of several millimeters. An aligned X-ray mask consisting of patterned Au is subsequently used to expose the PMMA in desired locations. The exposed PMMA is then removed (FIG. 13-6) by any suitable developing solution which results in a mold with the plating base exposed at the substrate surface. The top layer of exposed titanium is etched to reveal the underlying copper base. Magnetic material such as permalloy (78% Ni, 22% Fe) is then electroplated (FIG. 13-7) into the mold (produced by the exposure and development process) to form the stationary elements fixed to the substrate. After electroplating, the PMMA and electroplated material is lapped (FIG. 13-8) to form a flat surface of a specified thickness (e.g., lap to 500 microns thickness). Finally, the PMMA is removed (FIG. 13-9) using a suitable solvent (e.g., methylene chloride) to yield the fixed stator elements. FIG. 14 shows the elements that are fixed to the substrate surface. The round elements shown in FIG. 14 can be used as bearing and gear shafts.

Moving elements, such as actuators, gears, links, bearings, and retainers, are fabricated in a similar manner and lapped to the desired thickness. However, after the PMMA is removed following the lapping step, these parts must be chemically undercut (e.g., with a Cu plating base, where ammonium hydroxide is used to etch the Cu) so that each part can be completely released from the substrate. When freed from the substrate, these parts are then positioned and secured by retaining elements into their proper positions on the substrate to complete the three dimensional mechanical assembly. The coils are then inserted into the openings (FIG. 13-10) on the backside of the substrate to complete the magnetic circuit. Additional control circuitry may also be installed on the backside of the substrate. Input wires are bonded on the inside of the cover to insulated feedthroughs. The cover is brazed in place to form the final sealing which isolates the electrical elements from the external environment shown in FIGS. 3a and 3b. When completed, the present invention has mechanical elements exposed on one side of a substrate (as seen in FIG. 14) and available for connection to a mechanical load while the electrical elements are completely isolated and protected from the external environment by formation within the substrate.

Figure 15:
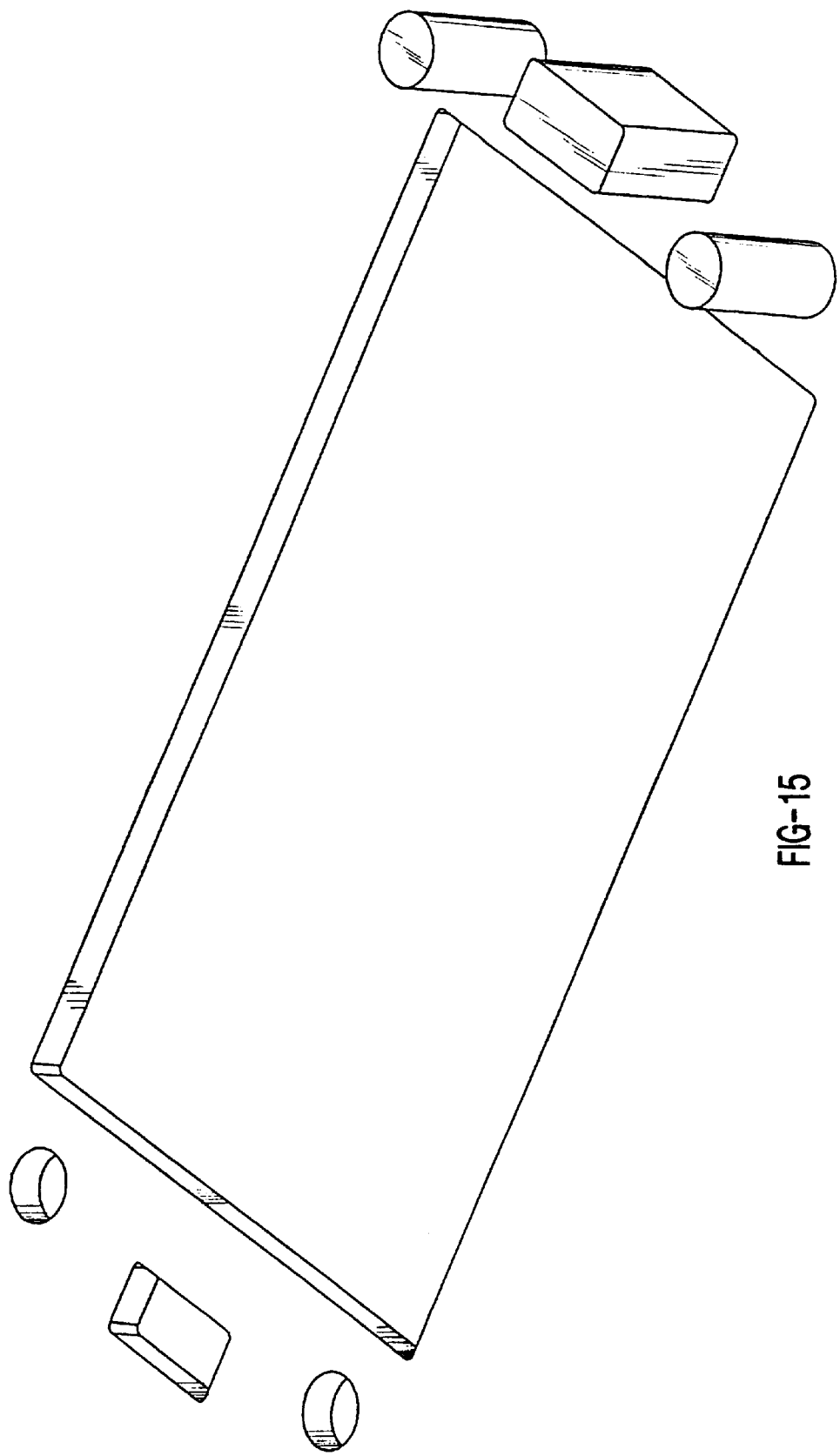
FIG. 15 is a representative side perspective view of a substrate fabricated according to a modified LIGA fabrication process.

A second technique can be used to fabricate the stator base shown in FIG. 15. In this technique, the PMMA is patterned and electroplated so that holes remain in the electroplated material where previously there were round shafts or other stator elements as shown in FIG. 14. The technique disclosed with regard to FIG. 15 is effectively the converse of FIG. 14, with openings where there were previously protrusions, and vice versa. Free shafts can then be inserted into the substrate holes and other stator elements can be inserted into their appropriate openings. This arrangement results in a number of advantages. For example, because there is now a larger area of electroplated material, the adhesion of the large area provides greater shear resistance to mechanical loads. Further, shaft adhesion no longer relies solely on thin film adhesion between the dissimilar materials of the shaft and base. In addition, any shaft length can be used for applications that require multiple layers of mechanical components. Finally, commercial rod and tubing is readily available in sub-millimeter diameters. Several components of the milliengine, therefore, could be fabricated from a second substrate upon which the fixed stator elements and moving gear, bearing, and actuator elements are assembled. In all, this "peg-board" approach offers increased flexibility for batch assembly of LIGA fabricated devices.

Complex three dimensional millimeter-sized structures can also be constructed using the peg-board approach. This was illustrated in FIGS. 6a and 6b, with a link and bearing arrangement used to transfer load from the linear actuators to the pinion gears. The LIGA process currently permits fabrication of only two dimensional structures. The present invention, however, provides for fabrication of a third dimension (thickness), which is controlled by a lapping step described in FIG. 13-8. By rotating a two dimensional milli-sized structure out of plane from its original plane of fabrication, each resulting three dimensional structure can be "plugged" into receptacles to create other more complex structures. Therefore, output gear 61 of FIG. 1 may be fabricated to have a plurality of receptacles which can be used to mount rotated two dimensional structures to create three dimensional structures.

Figure 16:
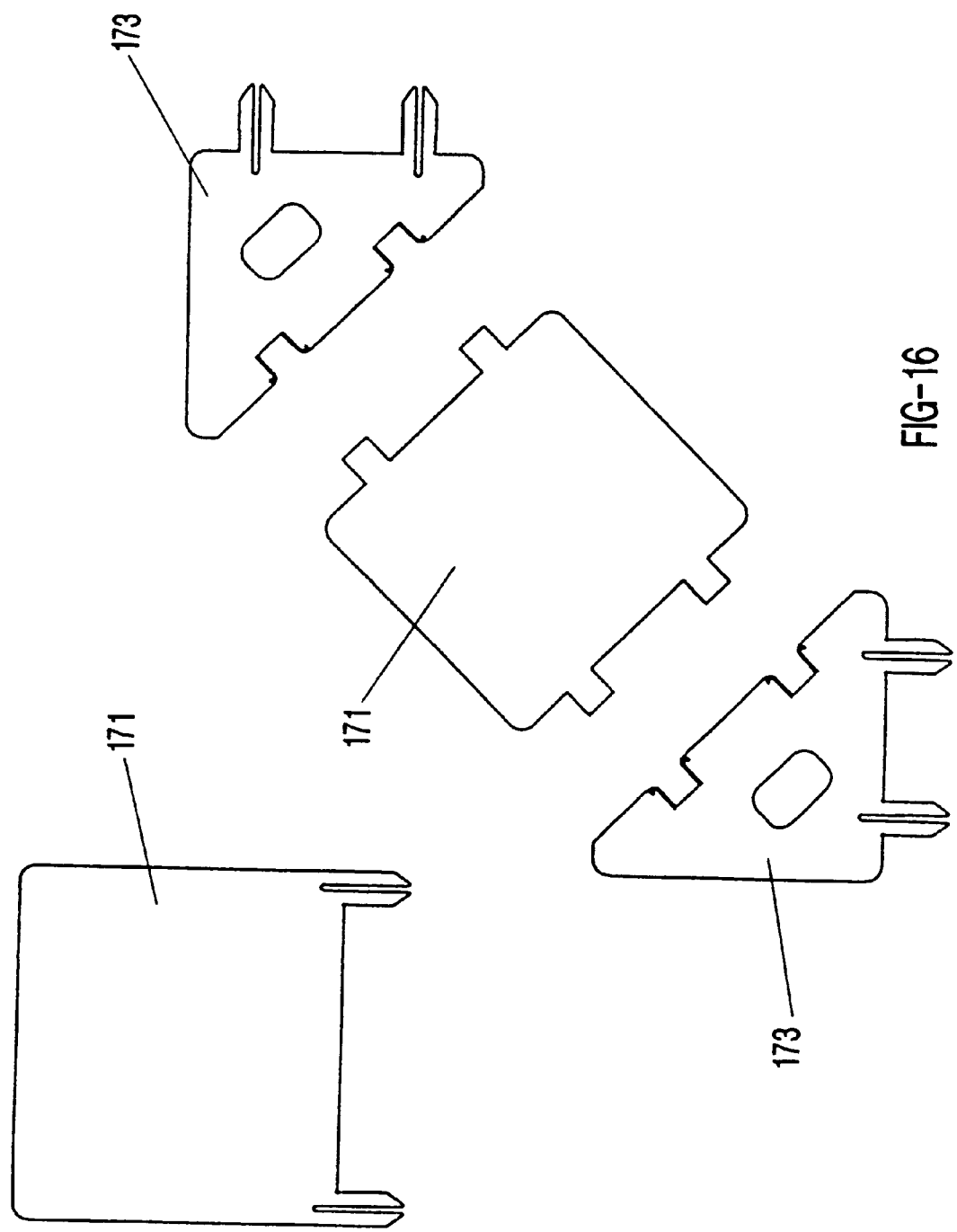
FIG. 16 illustrates components from a fabricated two dimensional milliengine millimirror.
Figure 17:
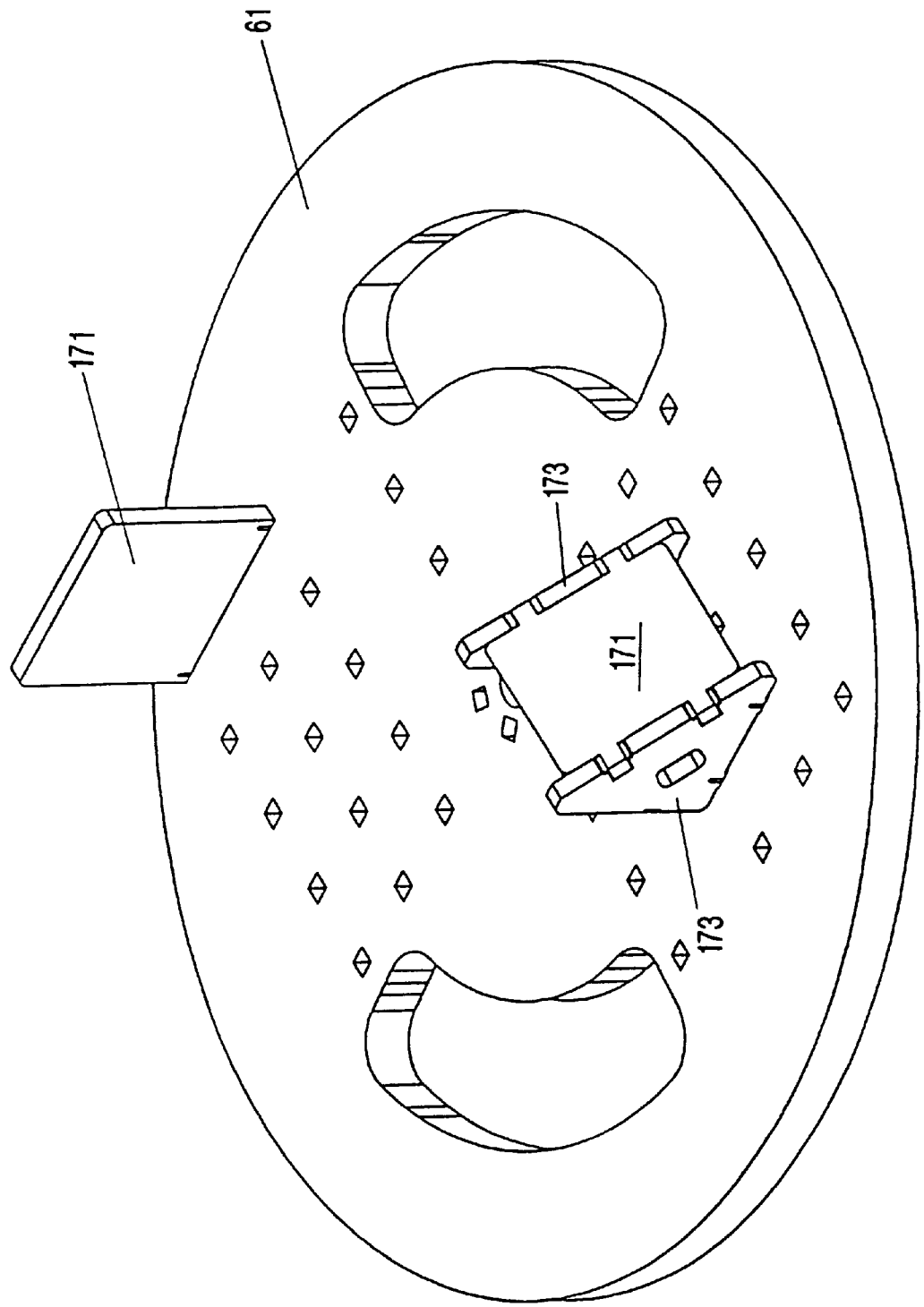
FIG. 17 illustrates the milliengine millimirror of FIG. 16 when in a three dimensional arrangement.

As an example, FIG. 16 illustrates a possible fabrication pattern for two mirror elements 171 and two support structures 173, both being originally LIGA fabricated as two dimensional structures. With these structures, FIG. 17 illustrates the construction of a three dimensional millimirror system. In this example, two LIGA fabricated millimirror support structures 171 are rotated 90° from their original plane of fabrication and inserted into receptacles formed in output gear 61. Protruding spring elements built into the support structures' base (similar to the clip arrangement described previously) secure them in place to the substrate of output gear 61. A LIGA fabricated millimirror 171 having a plurality of coupling tabs on its periphery is then positioned on a support structure 171 to form a three dimensional structure. Each support structure 173 also incorporates a means for retaining adapted to secure the millimirror structure to the output gear 61. Rotation of output gear 61, according to the present invention, then enables positioning of the millimirror to a desired orientation and frequency. A single mirror structure is also shown in FIG. 16 which has been inserted into receptacles in the output gear 61 to form a simple adjustable mirror. Other structures can be built up in the same manner to any degree of complexity or to any orientation desired.

The packaging used for the present invention is especially important in applications involving hazardous, corrosive or liquid environments. The milliengine of the present invention is designed to have moving mechanisms located on one side of a substrate with all electrical elements located on the opposite side of the substrate. The magnetic coils used to drive the actuator elements are located on the backside of the substrate where they can be sealed from the environment by a metal covering which has electrical feed-throughs. Control electronics which would be used to drive the device at desired speeds or intervals would also be located on the backside of the substrate. The electrical elements are isolated from environments such as liquids or gasses which could degrade or destroy the magnetic coils. This type of arrangement permits applications in difficult environments such as, for example, inside the human body. A hermetically sealed milliengine device could operate pumps within the human body while completely isolating the drive electronics of the milliengine from the corrosive liquid environment of the body. While electrostatically driven devices would be unsuitable for such applications, the magnetic actuation methodology of the present invention, along with the packaging design used, allows the output drive mechanism to be immersed in a liquid environment and operate successfully.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of milli-machined milli-cutting devices that use milli-machining techniques for feature size definition, is followed.

We claim:

1. A device for converting electromagnetic energy to mechanical energy, the device comprising:
   (a) a substrate base fabricated in the millimeter domain;
   (b) a plurality of drive means formed upon the substrate base, each drive means adapted for axial coordinate movement;
   (c) a plurality of links, each link rotatably attached to each drive means at a first end by a pivoting joint coupled to the substrate;
   (d) a plurality of rotatable drive pinions corresponding to each drive means, each drive pinion formed upon the substrate, each link rotatably attached to each drive pinion at a second end by a pivoting joint coupled to the substrate; and
   (e) at least one rotatable output gear formed upon the substrate, the output gear meshing with each drive pinion in gear-like relationship to produce a positive torque about the output gear's center of rotation, the output gear suited to provide rotational energy to an external mechanical load.

2. The device according to claim 1, wherein each drive means further includes at least one stator and is operationally phase shifted with respect to any other drive means.

3. The device according to claim 2, wherein each stator has at least one hole formed therein, each stator being in electrical communication with an adjacent stator by a magnetic circuit attached to each hole.

4. The device of claim 3, wherein the plurality of drive means includes a primary drive means having first and second magnetic circuits, and a secondary drive means having third and fourth magnetic circuits.

5. The device of claim 4, wherein each drive means is phase shifted by approximately 90° with respect to any other drive means.

6. The device of claim 3, wherein each magnetic circuit further includes a conductive coil wound about a conductive core, each end of the conductive core being electrically connected to each hole in each stator.

7. The device of claim 6, wherein each magnetic circuit is disposed within the substrate base.

8. The device of claim 3, wherein each link is restrained to the substrate base by a retaining means.

9. The device of claim 3, wherein the plurality of drive pinions are calibrated to produce a positive torque about a center of the output gear.

10. The device of claim 5, wherein the plurality of links are a primary link and a secondary link, the primary link being rotatably attached to the primary drive means, the secondary link being rotatably attached to the secondary drive means.

11. The device of claim 5, further including a plurality of roller bearings and a plurality of means for retaining, each means for retaining securably attached to the substrate, each means for retaining adapted to keep the drive pinions, links and output gear secured to the substrate.

12. The device of claim 3, further including control electronics disposed within the substrate base.

13. The device according to claim 4, wherein the primary drive means further includes a first stator, a central stator and a second stator, the first stator and the central stator being in electrical communication through the first magnetic circuit, the central stator and the second stator being in electrical communication through the second magnetic circuit, the first and second magnetic circuits adapted to control the operation of the primary drive means in an axial coordinate direction, and wherein the secondary drive means further includes a first stator, a central stator and a second stator, the first stator and the central stator being in electrical communication through the third magnetic circuit, the central stator and the second stator being in electrical communication through the fourth magnetic circuit, the third and fourth magnetic circuits adapted to control the operation of the secondary drive means in an axial coordinate direction.

14. An engine comprising:
   (a) a substrate base fabricated in the millimeter domain;
   (b) a primary drive means formed on the substrate base, the primary drive means electromagnetically controlled to operate in an axial coordinate direction;
   (c) at least one secondary drive means formed on the substrate base, the secondary drive means electromagnetically controlled to operate in an axial coordinate direction and out of phase with the primary drive means;
   (d) a first pinion gear formed upon the substrate;
   (e) a first linkage means for linking the first pinion gear to the primary drive means in rotatable relationship;
   (f) at least one second pinion gear formed upon the substrate;
   (g) at least one second linkage means for linking each second pinion gear to each secondary drive means in rotatable relationship; and (h) at least one output gear formed upon the substrate, the output gear positioned between the first and each second pinion gears and in gear-like communication with the first and each second pinion gears, the output gear suited to provide power to an external mechanical load.

15. The engine of claim 14 wherein each secondary drive means is magnetically phase shifted from the primary drive means.

16. The engine of claim 15, wherein the primary and secondary drive means are calibrated to control the first and second pinion gears to produce a positive torque about a center of the output gear.

17. The engine of claim 16, further including a plurality of rotatable roller bearings secured to the substrate base.

18. The engine of claim 17, further including a plurality of means for restraining, each means for restraining attaching the first pinion gear, the first linkage means, each second pinion gear, each second linkage means, the output gear and each roller bearing to the substrate base.

19. The engine of claim 18, further including control electronics disposed within the substrate base, the control device adapted to control the engine at predefined frequencies and speeds.

20. The engine of claim 19, wherein the primary drive means further includes a first stator, a central stator and a second stator, the first stator and the central stator being in electrical communication through a first magnetic circuit, the central stator and the second stator being in electrical communication through a second magnetic circuit, the first and second magnetic circuits adapted to control the operation of the primary drive means in an axial coordinate direction, and wherein each secondary drive means further includes a first stator, a central stator and a second stator, the first stator and the central stator being in electrical communication through a third magnetic circuit, the central stator and the second stator being in electrical communication through a fourth magnetic circuit, the third and fourth magnetic circuits adapted to control the operation of each secondary drive means in an axial coordinate direction.

21. A motor fabricated in the millimeter domain, the motor comprising:

(a) a substrate base;

(b) a primary drive means formed on the substrate base, the primary drive means electromagnetically controlled to operate in a linear coordinate direction;

(c) at least one secondary drive means formed on the substrate base, each secondary drive means electromagnetically controlled to operate in a linear coordinate direction and out of phase with the primary drive means;

(d) a plurality of rotatable drive pinion gears formed upon the substrate corresponding to each drive means;

(e) a plurality of linkage means for linking the each drive pinion gear to each drive means in rotatable relationship; and (f) at least one output gear formed upon the substrate, the output gear positioned between each drive pinion gear and in gear-like communication with each pinion gear, the output gear suited to provide power to an external mechanical load.

22. The motor of claim 20, wherein each drive means is operationally controlled by a plurality of magnetic circuits to phase shift each drive means from any other drive means, to produce a positive torque about a center of the output gear.

23. The motor of claim 21, further including a plurality of means for retaining, each means for retaining attaching the drive means, each drive pinion gear, each linkage means and the output gear to the substrate to prevent disengagement therefrom.

* * * * *